United States Patent
Abramovitz

(10) Patent No.: US 11,146,466 B2
(45) Date of Patent: Oct. 12, 2021

(54) METHOD FOR IDENTIFYING AN EVENT IMPACTING THE QOE OF AN END-USER OF A NETWORK EQUIPMENT

(71) Applicant: Thomson Licensing, Cesson-Sevigne (FR)

(72) Inventor: Assi Abramovitz, Netanya (IL)

(73) Assignee: Thomson Licensing, Cesson-Sevigne (FR)

( * ) Notice: Subject to any disclaimer, the term of this patent is extended or adjusted under 35 U.S.C. 154(b) by 0 days.

(21) Appl. No.: 16/954,415

(22) PCT Filed: Dec. 28, 2017

(86) PCT No.: PCT/IL2017/051400
§ 371 (c)(1),
(2) Date: Jun. 16, 2020

(87) PCT Pub. No.: WO2019/130288
PCT Pub. Date: Jul. 4, 2019

(65) Prior Publication Data
US 2021/0083952 A1    Mar. 18, 2021

(51) Int. Cl.
*H04L 12/24* (2006.01)
(52) U.S. Cl.
CPC ................ *H04L 41/5067* (2013.01)
(58) Field of Classification Search
CPC . H04L 41/5067; H04L 41/16; H04L 41/5009; H04L 41/5019; H04L 41/5003; H04L 65/80
USPC ......................................................... 709/224
See application file for complete search history.

(56) References Cited

U.S. PATENT DOCUMENTS

| | | | | |
|---|---|---|---|---|
| 2011/0244879 A1* | 10/2011 | Siomina | ................. | H04W 4/02 455/456.1 |
| 2014/0140213 A1* | 5/2014 | Raleigh | ................. | H04L 65/601 370/235 |
| 2014/0185431 A1* | 7/2014 | Chen | ..................... | H04L 47/122 370/225 |
| 2015/0341812 A1* | 11/2015 | Dion | ................. | H04N 21/2404 370/252 |

(Continued)

FOREIGN PATENT DOCUMENTS

| | | |
|---|---|---|
| WO | 2016/196044 A1 | 12/2016 |
| WO | 2017/143139 A1 | 8/2017 |

*Primary Examiner* — Ruolei Zong
(74) *Attorney, Agent, or Firm* — Vincent Edward Duffy

(57) ABSTRACT

In today's network management world, there are various solutions that collect data and presume to identify events impacting the QoE of the end-users. However, such solutions usually do not try to address the question of whether the end-users are actually impacted. These solutions usually look at certain types of known problems and try to detect if that problem exists in the end-user's network, and from that they conclude that the end-user might be impacted. The method according to an embodiment of the invention enables to proactively identify that an end-user is actually experiencing an event impacting the QoE in his home network. The proposed solution enables the detection of event affecting an end-user's network, regardless of the type of the network and without looking for specific issues. This knowledge may be a valuable asset of an Internet Service Provider which may fix issues quicker or mitigate end-users' dissatisfaction.

12 Claims, 3 Drawing Sheets

(56) References Cited

U.S. PATENT DOCUMENTS

2016/0337676 A1* 11/2016 Oyman ................. H04W 60/04
2017/0186019 A1*  6/2017 Loeb .................... G06Q 30/016

* cited by examiner

METHOD FOR IDENTIFYING AN EVENT IMPACTING THE QOE OF AN END-USER OF A NETWORK EQUIPMENT

This application claims the benefit, under 35 U.S.C. § 365 of International Application PCT/IL17/051400, filed Dec. 28, 2017, which was published in accordance with PCT Article 21(2) on Jul. 4, 2019, in English.

TECHNICAL FIELD

The present invention relates to Quality of Experience or QoE of end-users and more particularly to methods for predicting occurrence of events impacting the QoE of end-users as well as determining the cause of such events.

BACKGROUND

The Internet Service Providers (SP) market is very competitive. The services proposed by the different ISP are often equivalent and the price of the service to the end-user plays a big role in the choice of an ISP, as well as the quality of the technical support and the reliability of the service. The cost of maintaining the service reliably and the quality of technical support represent a big portion of the cost of the service. There are many efforts aimed at reducing the cost of support while maintaining or improving the QoE of the end-users.

In today's network management world, there are various solutions that collect data and presume to identify events impacting the QoE of the end-users. However, such solutions usually do not try to address the question of whether the end-users are actually impacted. These solutions usually look at certain types of known problems and try to detect if that problem exists in the end-user's network, and from that they conclude that the end-user might be impacted.

The present invention has been devised with the foregoing in mind.

SUMMARY OF INVENTION

According to a first aspect of the invention there is provided a computer implemented method for identifying an event impacting a Quality of Experience QoE of an end-user of a network equipment, the method comprising:
  Determining an occurrence of said event impacting the QoE of the end-user of the network equipment by determining whether values of parameters collected by said network equipment correspond to values of the same parameters when an event impacting the QoE of an end-user of a network equipment actually occurred,
  Upon detection of the occurrence of said event impacting the QoE of the end-user of the network equipment, collecting parameters representative of at least one communication medium of said network equipment for identifying said event impacting the QoE of the end-user of the network equipment.

Such a method enables to proactively identify that an end-user is actually experiencing an event impacting the QoE in his home network. The proposed solution enables the detection of event affecting an end-user's network, regardless of the type of the network and without looking for specific issues. This knowledge may be a valuable asset of an Internet Service Provider which may fix issues quicker or mitigate end-users' dissatisfaction.

The method consists in determining if an end-user is actually experiencing an event impacting the QoE by comparing data collected by the network equipment with data corresponding to an actual occurrence of an event impacting the QoE.

Then, parameters representative of a communication medium of said network equipment are collected in order to determine causes of the event.

According to an embodiment of the invention, the method further comprises a learning phase comprising:
  classifying parameters representative of a current QoE of end-users of network equipments into at least a first category corresponding to an occurrence of an event impacting the QoE of an end-user of a network equipment and a second category corresponding to a satisfactory level of QoE of an end-user of a network equipment.

There are various ways to classify parameters representative of a current QoE of end-users of network equipments into at least two categories: event occurring and no event occurring.

This classification is realized by feeding parameters representative of a current QoE of end-users of network equipments to a learning algorithm to build a model.

The parameters representative of a current QoE of end-users of network equipments are for example collected from a large number of network equipments, or collected only from the considered network equipment. Other information such as the fact that an end-user has contacted an ISP to report an issue may be collected as well.

The parameters representative of a current QoE are for example a version of an operating system of the network equipment, whether an end-user has accessed a user-interface of the network equipment, etc. Other parameters maybe obtained using, for example Deep Packet Inspection, such as if the support webpage of the ISP is accessed, speed test traffic, etc. parameters related to the Operating System of the network equipment, a number of accesses to the network equipment's User Interface, a number of restarts of the network equipment triggered by an end-user. Other parameters such as parameter representative of DHCP (Dynamic Host Configuration Protocol) release/renew events as well as parameters indicating Wi-Fi on/off or device restarts are also collected.

According to an embodiment of the invention, determining the occurrence of said event impacting the QoE consists in collecting parameters representative of a current QoE of said end-user of said network equipment and determining to which of the first and the second category said collected parameters correspond.

This embodiment requires the parameters representative of a current QoE to be available.

According to an embodiment of the invention, when the parameters representative of a current QoE of end-users of network equipments belongs to the first category:
  collecting parameters representative of a communication medium of said networks equipments,
  classifying said parameters representative of a communication medium of said networks equipments into said first category corresponding to an occurrence of an event impacting the QoE and said second category corresponding to a satisfactory level of QoE of an end-user of a network equipment.

It is possible to predict the occurrence of an event impacting the QoE of an end-user of a network equipment directly from parameters representative of the communication medium.

Those parameters representative of the communication medium enable to identify the causes of the event. The ISP may then proactively inform the end-user about actions that may be taken to improve the situation.

Parameters representative of the communication medium are for example a bitrate on each interface of the network device, the medium available on Wi-Fi, the number of error bits, TX/RX transmission rates on all interfaces of the network device, number of clients on the network of the ISP, identified error events.

According to an embodiment of the invention, determining the occurrence of said event impacting the QoE consists in collecting parameters representative of a communication medium of said end-user of said network equipment and determining to which of the first and the second category said collected parameters correspond.

This embodiment enables to run the method according to an embodiment of the invention in which the parameters representative of a current QoE cannot be collected.

Another object of the invention concerns a network device capable of identifying an event impacting a Quality of Experience QoE of an end-user of a network equipment, the said network device comprising at least one hardware processor configured to:

Determine an occurrence of said event impacting the QoE of the end-user of the network equipment by determining whether values of parameters collected by said network equipment correspond to values of the same parameters when an event impacting the QoE of an end-user of a network equipment actually occurred, Upon detection of the occurrence of said event impacting the QoE of the end-user of the network equipment, collect parameters representative of a communication medium of said network equipment for identifying said event impacting the QoE of the end-user of the network equipment.

Such a network device is for example a remote server connected to a plurality network equipments. The network device collects information from the network equipments in order to determine the occurrence of events.

According to an embodiment of the invention, the hardware processor is further configured to run a learning phase comprising:

classifying parameters representative of a current QoE of end-users of network equipments into at least a first category corresponding to an occurrence of an event impacting the QoE of an end-user of a network equipment and a second category corresponding to a satisfactory level of QoE of an end-user of a network equipment.

According to an embodiment of the invention, determining the occurrence of said event impacting the QoE consists in collecting parameters representative of a current QoE of said end-user of said network equipment and determining to which of the first and the second category said collected parameters correspond.

According to an embodiment of the invention, the hardware processor is further configured to, when the parameters representative of a current QoE of end-users of network equipments belongs to the first category:

collect parameters representative of a communication medium of said networks equipments, classify said parameters representative of a communication medium of said networks equipments into said first category corresponding to an occurrence of an event impacting the QoE and said second category corresponding to a satisfactory level of QoE of an end-user of a network equipment.

According to an embodiment of the invention, determining the occurrence of said event impacting the QoE consists in collecting parameters representative of a communication medium of said end-user of said network equipment and determining to which of the first and the second category said collected parameters correspond.

Some processes implemented by elements of the invention may be computer implemented. Accordingly, such elements may take the form of an entirely hardware embodiment, an entirely software embodiment (including firmware, resident software, micro-code, etc.) or an embodiment combining software and hardware aspects that may all generally be referred to herein as a "circuit", "module" or "system". Furthermore, such elements may take the form of a computer program product embodied in any tangible medium of expression having computer usable program code embodied in the medium.

Since elements of the present invention can be implemented in software, the present invention can be embodied as computer readable code for provision to a programmable apparatus on any suitable carrier medium. A tangible carrier medium may comprise a storage medium such as a floppy disk, a CD-ROM, a hard disk drive, a magnetic tape device or a solid state memory device and the like. A transient carrier medium may include a signal such as an electrical signal, an electronic signal, an optical signal, an acoustic signal, a magnetic signal or an electromagnetic signal, e.g. a microwave or RF signal.

BRIEF DESCRIPTION OF THE DRAWINGS

Embodiments of the invention will now be described, by way of example only, and with reference to the following drawings in which.

DETAILED DESCRIPTION

As will be appreciated by one skilled in the art, aspects of the present principles can be embodied as a system, method or computer readable medium. Accordingly, aspects of the present principles can take the form of an entirely hardware embodiment, an entirely software embodiment, (including firmware, resident software, micro-code, and so forth) or an embodiment combining software and hardware aspects that can all generally be referred to herein as a "circuit", "module", or "system". Furthermore, aspects of the present principles can take the form of a computer readable storage medium. Any combination of one or more computer readable storage medium(a) may be utilized.

Figure 1:
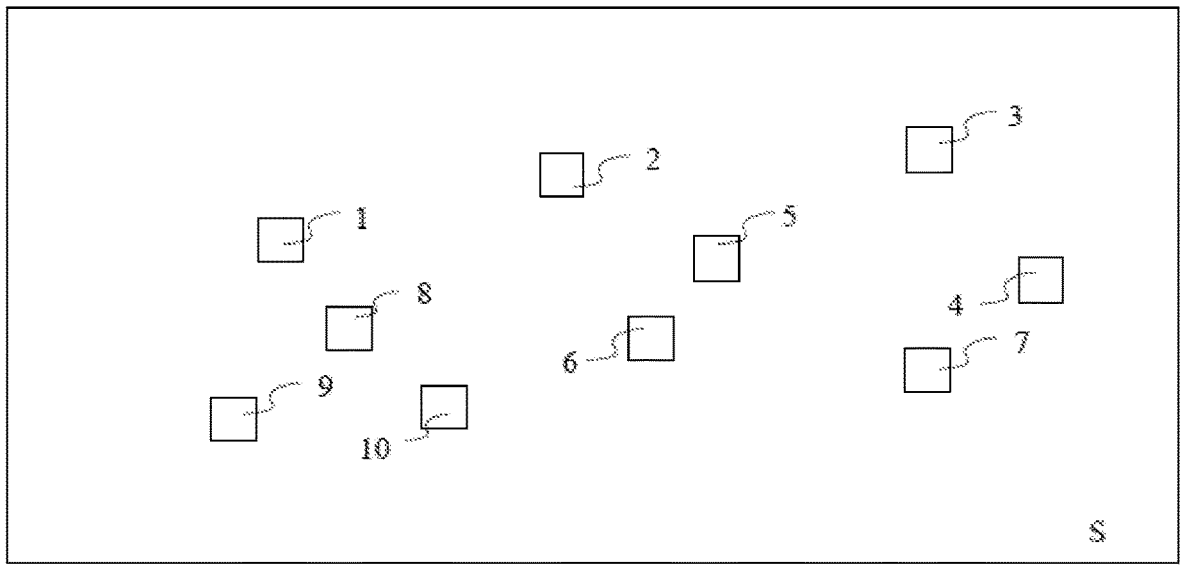
FIG. 1 represents a system S comprising a plurality of network equipments according to an embodiment of the invention.
Figure 1:
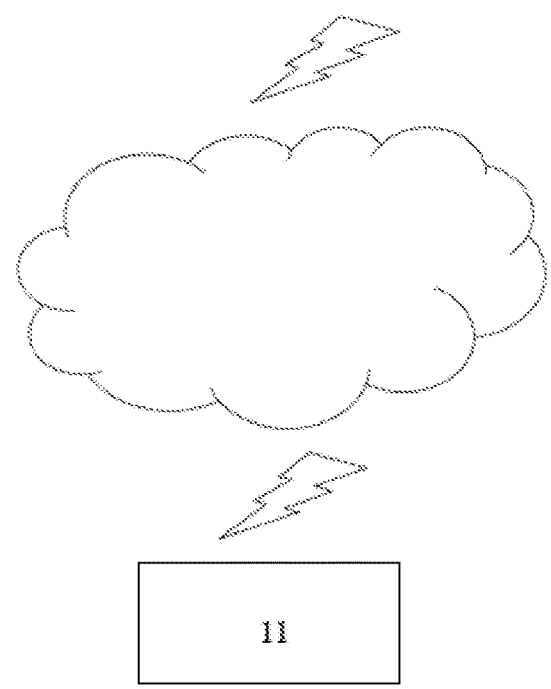

FIG. 1 represents a system S comprising a plurality of network equipments 1-10. Such network devices are for example gateways or wireless access points.

Data such as data rate, physical layer data rate, an amount of spatial streams used, channel bandwidth, medium availability and Received Signal Strength Indicator (RSSI), a version of an operating system of the network equipment, whether an end-user has accessed a user-interface of the network equipment, other parameters maybe obtained using, for example Deep Packet Inspection (DPI), such as if a webpage of the IPS is accessed, speed test traffic, etc. are collected for each network equipments 1-10 and are transmitted to at least one remote network device 11 belonging to the same Internet Service Provider controlling the network equipments 1-10, or may be managed by a third party, and execute the method according to an embodiment of the invention.

Figure 2:
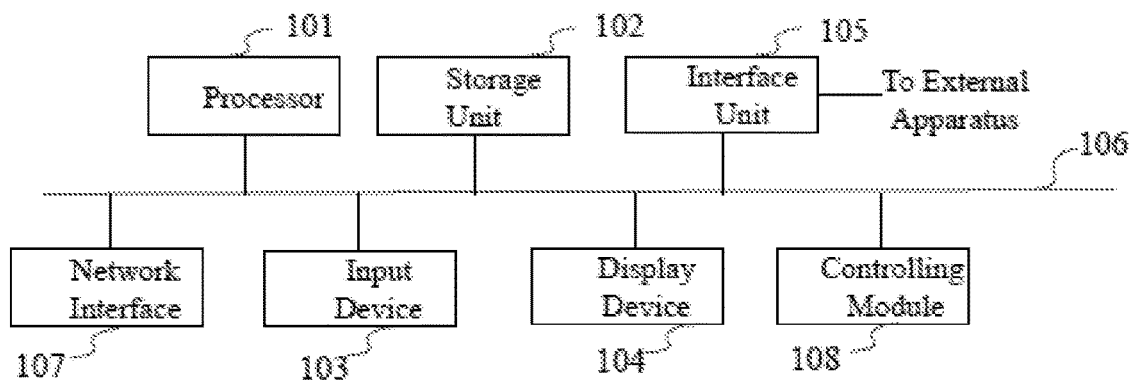
FIG. 2 represents a more detailed view of one of the network equipment according to an embodiment of the invention.

FIG. 2 represents a more detailed view of one of the network equipments 1-10 according to an embodiment of the invention.

A network equipment 1-10 may comprise at least one hardware processor 101, a storage unit 102, an input device 103, a display device 104, an interface unit 105, a network interface 107, at least one network interface 108, e.g. a wireless interface or a DSL interface, and a controlling module 109 which are connected by a bus 106. Of course, constituent elements of the network equipment 1-10 may be connected by a connection other than a bus connection.

The processor 101 controls operations of the network equipment 1-10. The storage unit 102 stores at least one program capable of monitoring communications to and from the network equipment 1-10, to be executed by the processor 101, and various data, such as parameters used by computations performed by the processor 101, intermediate data of computations performed by the processor 101, and so on. The processor 101 may be formed by any known and suitable hardware, or software, or a combination of hardware and software. For example, the processor 101 may be formed by dedicated hardware such as a processing circuit, or by a programmable processing unit such as a CPU (Central Processing Unit) that executes a program stored in a memory thereof.

The storage unit 102 may be formed by any suitable storage or means capable of storing the program, data, or the like in a computer-readable manner. Examples of the storage unit 102 include non-transitory computer-readable storage media such as semiconductor memory devices, and magnetic, optical, or magneto-optical recording media loaded into a read and write unit. The program causes the processor 101 to perform a process according to an embodiment of the present disclosure as described hereinafter with reference to FIG. 4.

The input device 103 may be formed by a keyboard, a pointing device such as a mouse, or the like for use by the user to input commands, for example to make user's selections of parameters used for selecting the transmission interface to be used. The display device 104 may be formed by a display device to display, for example, a Graphical User Interface (GUI). The input device 103 and the display device 104 may be formed integrally by a touchscreen panel, for example.

The interface unit 105 provides an interface between the network equipment 1-10 and an external apparatus. The interface unit 105 may be communicable with the external apparatus via cable or wireless communication. Such an external apparatus is for example a Set Top Box or a smartphone.

A network interface 107 provides a connection between the network equipment 1-10 and the communication device 11 via a backbone network (not shown in the figures), such as the Internet. The network interface 107 may provide, depending on its nature, a wired or a wireless connection to the backbone network.

A monitoring module 108 gathers information such as data rate, physical layer data rate, an amount of spatial streams used, channel bandwidth, medium availability and Received Signal Strength Indicator (RSSI), a version of an operating system of the network equipment, whether an end-user has accessed a user-interface of the network equipment, other parameters maybe obtained using, for example Deep Packet Inspection (DPI), such as if a webpage of the IPS is accessed, speed test traffic, etc.

Figure 3:
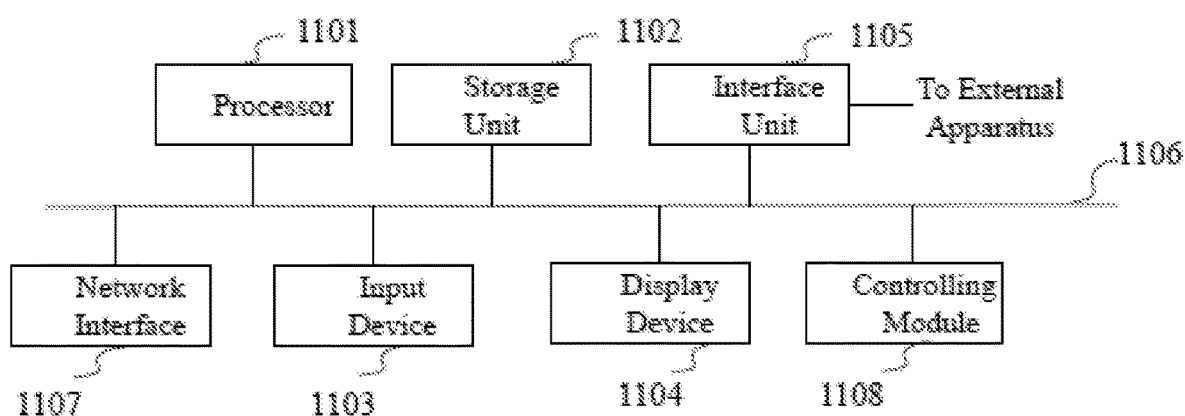
FIG. 3 is a schematic block diagram illustrating an example of a network device according to an embodiment of the invention.

FIG. 3 is a schematic block diagram illustrating an example of a network device 11 according to an embodiment of the invention.

The network device 11 comprises at least one hardware processor 1101, a storage unit 1102, an input device 1103, a display device 1104, an interface unit 1105 and a network interface 1107 and a controlling module 1108 which are connected by a bus 1106. Of course, constituent elements of the network device 11 may be connected by a connection other than a bus connection.

The processor 1101 controls operations of the network device 11. The storage unit 1102 stores at least one program capable of being executed by the processor 1101, and various data, such as parameters used by computations performed by the processor 1101, intermediate data of computations performed by the processor 1101, and so on. The processor 1101 may be formed by any known and suitable hardware, or software, or a combination of hardware and software. For example, the processor 1101 may be formed by dedicated hardware such as a processing circuit, or by a programmable processing unit such as a CPU (Central Processing Unit) that executes a program stored in a memory thereof.

The storage unit 1102 may be formed by any suitable storage or means capable of storing the program, data, or the like in a computer-readable manner. Examples of the storage unit 1102 include non-transitory computer-readable storage media such as semiconductor memory devices, and magnetic, optical, or magneto-optical recording media loaded into a read and write unit. The program causes the processor 1101 to perform a process according to an embodiment of the present disclosure as described hereinafter with reference to FIG. 4.

The input device 1103 may be formed by a keyboard, a pointing device such as a mouse, or the like for use by the user to input commands, to make user's selections of parameters used for selecting the transmission interface to be used. The output device 1104 may be formed by a display device to display, for example, a Graphical User Interface (GUI). The input device 1103 and the output device 1104 may be formed integrally by a touchscreen panel, for example.

The interface unit 1105 provides an interface between the network device 11 and an external apparatus. The interface unit 1105 may be communicable with the external apparatus via cable or wireless communication.

The network interface 1107 provides a connection between the communication device 11 and the network equipments 1-10 through a backbone network (not shown in the figures), such as the Internet. The network interface 1107 may provide, depending on its nature, a wired or a wireless connection to the backbone network.

The controlling module 1108 analyzes and evaluates the QoE actually experienced by the end-users of the network equipments 1-10. The information gathered by the controlling module 1108 may include data rate, physical layer data rate, an amount of spatial streams used, channel bandwidth, medium availability and Received Signal Strength Indicator (RSSI), a version of an operating system of the network equipment, whether an end-user has accessed a user-interface of the network equipment, other parameters maybe obtained using, for example Deep Packet Inspection (DPI), such as if a webpage of the IPS is accessed, speed test traffic, etc.

Figure 4:
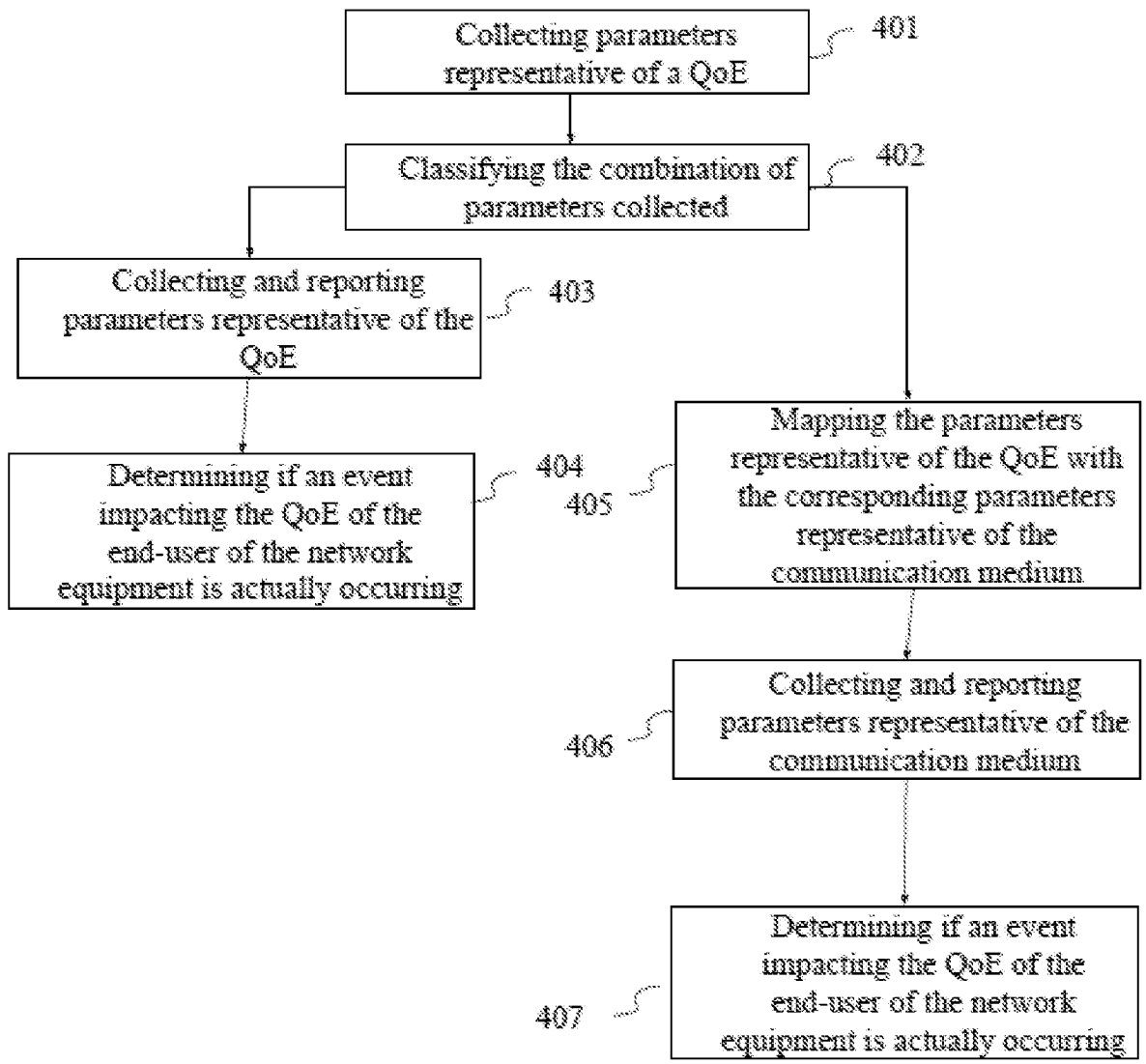
FIG. 4 is a flow chart representing the steps of a method for identifying an event impacting a Quality of Experience QoE of an end-user of a network equipment according to an embodiment of the invention.

FIG. 4 is a flow chart representing the steps of a method for identifying an event impacting a Quality of Experience QoE of an end-user of a network equipment 1-10 according to an embodiment of the invention.

In a step 401, each network equipment 1-10 collects parameters representative of a QoE of an end-user of said network equipments 1-10. These parameters may directly or indirectly indicate the end-user's QoE.

Such parameters are for example parameters related to the Operating System of the network equipment 1-10, a number of accesses to the network equipment's User Interface, a number of restarts of the network equipment triggered by an end-user. Parameters representative of DHCP (Dynamic Host Configuration Protocol) release/renew events as well as parameters indicating Wi-Fi on/off or device restarts are also collected.

Other parameters representative of the QoE of the network equipment 1-10 are collected using for example Deep Packet Inspection (DPI). Those parameters are for example a number of accesses to the IPS webpage, a speed test traffic, a Direct experience measurements based or Voice over IP (VoIP) metrics, etc.

The proposed parameters representative of the QoE are not always available, as they sometimes require specific agent software or more advanced computing power (e.g. DPI) and are therefore either not available at all or available only some of the time or on some of the homes. This brings a need to map the parameters representative of the QoE into parameters representative of a communication medium, so that user experience issues could be detected when only parameters representative of a communication medium are available.

On the other hand, the user experience statistics do not indicate what the problem may be, only that some problem exists. Therefore, it would be necessary to collect parameters representative of a communication medium when a user experience issue is detected, in order to identify the specific issue and fix it.

In a step 402, the processor 1101 of the network device 11 classifies the combination of parameters collected during the step into a binary signal: is there a QoE issue impacting an end-user of a network equipment 1-10 at the moment or not?

In order to classify the parameters collected during step 401 may be done for example by using a machine learning method, such as Support Vector Machine (SVM).

There are various ways to classify the parameters representative of a QoE of an end-user of said network equipments 1-10, one way to do it may be to generate some pre-classified data by collecting parameters representative of the QoE from a large number of network equipments 1-10, then determining for which network equipments 1-10 the end-users have contacted the technical support of theft ISP during the measurements and pre-classifying their combination of parameters representative of the QoE as "positive" examples meaning this combination of parameters representative of the QoE corresponds to a dissatisfaction event. These combinations of parameters representative of the QoE are fed to the machine learning algorithm to build a model from.

At the end of step 402, a first classifier is provided which enables to determine based on the parameters representative of the QoE collected by a network equipment 1-10 if an event is impacting the QoE of an end-user of said network equipment is actually occurring.

In a first embodiment of the invention, in a step 403 the processor 101 of a network equipment 1-10 collects parameters representative of the QoE and reports the collected parameters representative of the QoE to the network device 11

In a step 404, the processor 1101 of the network device 11 determines if an event impacting the QoE of the end-user of the network equipment 1-10 is actually occurring using the first classifier obtained during step 402.

When an event impacting the QoE of the end-user of the network equipment 1-10 is actually occurring, the network equipment 1-10 collects parameters representative of a communication medium of the network equipment such as a bitrate on each interface of the network device, the medium available on Wi-Fi, the number of error bits, TX/RX transmission rates on all interfaces of the network device, number of clients on the network of the ISP, identified error events.

Those parameters representative of the communication medium enable to identify the causes of the event. The ISP may then proactively inform the end-user about actions that may be taken to improve the situation.

In a second embodiment of the invention where the parameters representative of the QoE may not be collected by the network equipments 1-10 as collecting these parameters sometimes requires a specific agent software or more advanced computing power which may not be available in the network equipments 1-10, the processor 1101 of the network device 11 maps, in a step 405, the parameters representative of the QoE with the corresponding parameters representative of the communication medium, so that an event impacting the QoE of an end-user of a network equipment 1-10 can be detected when only parameters representative of the communication medium are available at the network equipment 1-10. At the end of step 405, a second classifier is provided which enables to determine based on the parameters representative of the communication medium collected by the network equipments 1-10 if an event is impacting the QoE of an end-user of said network equipment is actually occurring.

In a step 406, the processor 101 of a network equipment 1-10 collects parameters representative of the communication medium and reports the collected parameters representative of the communication medium to the network device 11.

In a step 407, the processor 1101 of the network device 11 determines if an event impacting the QoE of the end-user of the network equipment 1-10 is actually occurring using the second classifier obtained during step 405.

When an event impacting the QoE of the end-user of the network equipment 1-10 is actually occurring, the network device 11 uses the collected parameters representative of a communication medium of the network equipment to identify the causes of the event. The ISP may then proactively inform the end-user about actions that may be taken to improve the situation.

Although the present invention has been described hereinabove with reference to specific embodiments, the present invention is not limited to the specific embodiments, and modifications will be apparent to a skilled person in the art which lie within the scope of the present invention.

Many further modifications and variations will suggest themselves to those versed in the art upon making reference to the foregoing illustrative embodiments, which are given by way of example only and which are not intended to limit the scope of the invention, that being determined solely by the appended claims. In particular the different features from different embodiments may be interchanged, where appropriate.

The invention claimed is:

1. A computer implemented method for identifying an event impacting a Quality of Experience (QoE) of an end-user of a network equipment, said network equipment belonging to said end-user, the method being executed by said network equipment and comprising:
   determining whether values of parameters collected by said network equipment correspond to values of the same parameters when an event impacting the QoE of said end-user of said network equipment actually occurred; and
   upon determining that said collected values of parameters do correspond to values of the same parameters when an event impacting the QoE of said end-user actually occurred, collecting parameters representative of a communication medium of said network equipment for identifying said event impacting the QoE of the end-user of the network equipment.

2. The method according to claim 1 comprising a learning phase comprising:
   classifying parameters representative of a current QoE of end-users of network equipments into at least a first category corresponding to an occurrence of an event impacting the QoE of an end-user of a network equipment and a second category corresponding to a satisfactory level of QoE of an end-user of a network equipment.

3. The method according to claim 2, wherein determining whether values of parameters collected by said network equipment further includes collecting parameters representative of a current QoE of said end-user of said network equipment and determining to which of the first and the second category said collected parameters correspond.

4. The method according to claim 2 comprising, when the parameters representative of a current QoE of end-users of network equipments belongs to the first category:
   collecting parameters representative of a communication medium of said networks equipments,
   classifying said parameters representative of a communication medium of said networks equipments into said first category corresponding to an occurrence of an event impacting the QoE and said second category corresponding to a satisfactory level of QoE of an end-user of a network equipment.

5. The method according to claim 4 wherein determining whether values of parameters collected by said network equipment further includes collecting parameters representative of a communication medium of said end-user of said network equipment and determining to which of the first and the second category said collected parameters correspond.

6. The method according to claim 1 wherein the parameters collected by said network equipment are:
   a version of an operating system of said network equipment,
   a number of time said end-user has accessed a user-interface of said network equipment,
   a number of time a support webpage of an ISP managing said network equipment is accessed,
   speed test traffic,
   parameters related to the Operating System of said network equipment,
   a number of time said end-user accesses said network equipment's User Interface,
   a number of restarts of said network equipment triggered by said end-user,
   parameter representative of DHCP (Dynamic Host Configuration Protocol) release/renew events,
   parameters indicating Wi-Fi on/off in said network equipment.

7. A network device capable of identifying an event impacting a Quality of Experience (QoE) of an end-user of a network equipment, said network equipment belonging to said end-user, the said network device comprising a storage unit and at least one hardware processor configured to:
   determine whether values of parameters collected by said network equipment correspond to values of the same parameters when an event impacting the QoE of said end-user of said network equipment actually occurred; and
   upon determination that said collected values of parameters do correspond to values of the same parameters when an event impacting the QoE actually occurred, collect parameters representative of a communication medium of said network equipment for identifying said event impacting the QoE of the end-user of the network equipment.

8. The network device according to claim 7, wherein the hardware processor is further configured to run a learning phase comprising:
   classifying parameters representative of a current QoE of end-users of network equipments into at least a first category corresponding to an occurrence of an event impacting the QoE of an end-user of a network equipment and a second category corresponding to a satisfactory level of QoE of an end-user of a network equipment.

9. The network device according to claim 8, wherein determining whether values of parameters collected by said network equipment further includes collecting parameters representative of a current QoE of said end-user of said network equipment and determining to which of the first and the second category said collected parameters correspond.

10. The network device according to claim 8, wherein the hardware processor is further configured to, when the parameters representative of a current QoE of end-users of network equipments belongs to the first category:
    collect parameters representative of a communication medium of said networks equipments,
    classify said parameters representative of a communication medium of said networks equipments into said first category corresponding to an occurrence of an event impacting the QoE and said second category corresponding to a satisfactory level of QoE of an end-user of a network equipment.

11. The network device according to claim 10, wherein determining whether values of parameters collected by said network equipment further includes collecting parameters representative of a communication medium of said end-user of said network equipment and determining to which of the first and the second category said collected parameters correspond.

12. Non-transitory storage medium carrying instructions of program code that, when executed on a processor, performs a method comprising:
    determining whether values of parameters collected by said network equipment belonging to an end-user correspond to values of the same parameters when an event impacting the QoE of said end-user of said network equipment actually occurred; and upon determining that said collected values of parameters do correspond to values of the same parameters when an event impacting the QoE actually occurred, collecting parameters representative of a communication medium of said network equipment for identifying said event impacting the QoE of the end-user of the network equipment.

\* \* \* \* \*